(12) United States Patent
Flegel

(10) Patent No.: US 6,624,534 B1
(45) Date of Patent: Sep. 23, 2003

(54) OPTIONAL METER PANEL UTILIZING A CURRENT TRANSFORMER, FOR USE WITH A TRANSFER SWITCH

(75) Inventor: David D. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 0 days.

(21) Appl. No.: 09/949,452

(22) Filed: Sep. 7, 2001

(51) Int. Cl.[7] .................................................. H02J 7/00
(52) U.S. Cl. ............................................ 307/64; 307/43
(58) Field of Search ..................................... 307/43, 64

(56) References Cited

U.S. PATENT DOCUMENTS

| | | | | |
|---|---|---|---|---|
| 4,246,531 A | * | 1/1981 | Jordan | 322/28 |
| 4,675,598 A | * | 6/1987 | Boichot-Castagne | 324/119 |
| 4,679,786 A | * | 7/1987 | Rodgers | 482/54 |
| 5,419,761 A | * | 5/1995 | Narayanan et al. | 604/22 |
| 5,761,027 A | | 6/1998 | Flegel | |
| D400,183 S | | 10/1998 | Flegel | |
| 5,834,932 A | * | 11/1998 | May | 324/107 |
| 5,895,981 A | | 4/1999 | Flegel | |
| D425,490 S | | 5/2000 | Flegel | |
| 6,066,817 A | | 5/2000 | Flegel | |
| 6,107,701 A | | 8/2000 | Flegel | |
| 6,163,449 A | | 12/2000 | Flegel | |
| 6,184,461 B1 | | 2/2001 | Flegel | |
| 6,293,821 B1 | | 9/2001 | Flegel | |

OTHER PUBLICATIONS

GENTRAN Catalog, GT1094C, Reliance Time Controls, Inc., 1820 Layard Avenue, Racine, WI 53404, undated.

* cited by examiner

Primary Examiner—Brian Sircus
Assistant Examiner—Sharon Polk
(74) Attorney, Agent, or Firm—Boyle, Fredrickson, Newholm, Stein & Gratz, S.C.

(57) ABSTRACT

A power transfer device adapted for interconnection with the electrical system of a building includes a cabinet, a set of switches mounted to the cabinet, and power input wires interconnected with the switches for supplying power from an auxiliary power source, such as a generator. The switches interconnect with the electrical distribution panel of a building. The power transfer device includes a power input indicating member, such as a watt meter, and a current transformer input arrangement defining an opening through which one or more of the power supply wires extend. The current transformer arrangement is responsive to current in the power supply wires, so as to provide an input to the watt meter as to the amount of power supplied to the power transfer device from the generator.

12 Claims, 6 Drawing Sheets

OPTIONAL METER PANEL UTILIZING A CURRENT TRANSFORMER, FOR USE WITH A TRANSFER SWITCH

BACKGROUND AND SUMMARY OF THE INVENTION

This invention relates to a power inlet arrangement for providing power to the electrical system of a building, such as power supplied by a standby generator.

Portable generators may be used in certain situations to feed electrical power to residential and commercial load circuits during a utility power outage. These systems frequently include a power inlet box adapted for interconnection with the generator. The power inlet box is typically mounted to the exterior of a building. The power inlet box is connected to a transfer switching mechanism which continues the electrical path through circuit breakers associated with the transfer switching mechanism, to supply power to certain selected circuits of the load center as determined by the transfer switching mechanism circuit breakers. The circuits of the transfer switching mechanism are wired to selected circuits of the load center, through wiring housed within a conduit extending between the load center and the transfer switching mechanism.

The present invention relates to a power transfer switching mechanism such as is disclosed in application Ser. No. 09/062,257, filed Apr. 17, 1998, the disclosure of which is hereby incorporated by reference. The '257 application discloses a power input terminal arrangement in the power transfer switching mechanism in combination with a removable cover for preventing access to the power input terminal arrangement. The cover is provided with a power input structure, such as a socket or receptacle, connected to the terminal assembly for selectively receiving a plug connector electrically interconnected with a source of auxiliary power such as a generator. The power transfer switching mechanism in the '257 application provides a selective connection between the remote power inlet box and the switches of the switching mechanism.

While the above-described transfer switching mechanisms provide extremely convenient and simple arrangements for establishing direct, hardwired and selective connections with the power inlet box, it is sometimes desirable to provide a power transfer switching mechanism having a power input meter arrangement in its front-panel. With this modification, it is possible to monitor the amount of power provided by a generator during a power outage, so as to prevent overloading of and subsequent damage to the generator or to the building electrical system. Although the broad concept of integrally providing power input meters on a power transfer switching mechanism is well known, it is desirable to modify the power transfer switching mechanisms described in the aforementioned co-pending patent applications to provide an optional meter arrangement in a cover which is selectively engageable with the cabinet of the switching mechanism.

One form of a power input meter arrangement for use in connection with a power transfer switching mechanism is disclosed in Flegel U.S. Pat. No. 6,107,701 issued Aug. 22, 2000, the disclosure of which is hereby incorporated by reference. The '701 patent discloses a meter arrangement which is incorporated into the power supply from the remote power inlet box to the power input terminal arrangement of the power transfer switching mechanism. The system disclosed in the '701 patent provides a highly satisfactory system for selectively providing a power input meter arrangement in a power transfer switching mechanism, but requires a number of connections in order to interconnect the power input meters.

It is an object of the present invention to provide a transfer switching mechanism having a removable access cover provided with a power input meter arrangement for measuring input power to the transfer switching mechanism from a generator or from a power inlet connected with the generator. It is a further object of the present invention to provide a power input meter arrangement for use in a transfer switching mechanism, which eliminates the numerous connections involved in the prior art system. Another object of the present invention is to provide a transfer switching mechanism which is simple to install and which operates generally similarly to prior art transfer switching mechanisms. It is also an object of the present invention to provide a method for constructing a power transfer device having a power input meter arrangement for monitoring power supplied by a generator so as to prevent overloading thereof.

The invention contemplates an improvement in a power transfer arrangement for supplying power from a generator to the electrical system of a building. The power transfer arrangement includes a power inlet arrangement for interconnection with the generator for receiving power therefrom, and a power transfer device separate from the power inlet arrangement adapted for interconnection with the building electrical system. The invention resides in a power input indicating structure for selectively displaying the amount of power provided by the generator. The power transfer device includes a cabinet having a front panel to which is mounted a set of switches for controlling the supply of power from the power transfer device to the building electrical system. The power transfer device further includes a compartment defined by the cabinet at a location spaced from the set of switches. The cabinet defines an opening providing access to the compartment. The cover is positionable over the opening and removably engageable with the cabinet for selectively closing the opening for preventing access to the compartment. The power input indicating structure is fixed to the cover. The power input indicating structure includes at least one meter having a block-like rear portion and a convexly-shaped forward portion projecting through a vertically extending wall of the cover. The forward portion includes a transparent window having a support member for mounting a wattage scale visible through the window, and an indicator mounted for movement along the scale in response to the supplying of power from the generator.

The power input indicating structure is preferably in the form of one or more watt meters mounted to the cover. A current transformer input arrangement is interconnected with each watt meter. Each current transformer input arrangement includes a current transformer coil defining an opening through which a power input wire extends. The current transformer coil is located within the compartment defined by the cabinet, and the power input wire extends between the power inlet arrangement and the switches of the power transfer device, for supplying power to the power transfer device from the generator. In a known manner, the current transformer coil cooperates with the meter to form an electrical circuit. Current in the power input wire induces a corresponding current in the current transformer coil, which acts on the watt meter to output a reading indicative of power supplied to the power transfer device. In this manner, a power input meter arrangement can be provided for the power transfer device without the need for making direct connections of the power input meter in the power supply path.

The invention further contemplates an improvement in a power transfer device adapted for interconnection with the electrical system of a building and including a cabinet. The invention is in the form of a compartment associated with the cabinet and a cover removably connected to the cabinet for alternately preventing and permitting access to the compartment. The cover is provided with a meter arrangement with a current transformer input arrangement, to selectively measure levels of power provided from a source of auxiliary power connected to the power transfer device.

The invention also relates to a method for constructing a power transfer device for supplying power to the electrical system of a building from a generator in electrical communication with a separate power inlet arrangement. The method includes the step of providing a cabinet having a compartment and a plurality of switches interconnected with power supply wires extending through the compartment, for controlling the supply of power from the power transfer device to the building electrical system; providing a first cover member adapted for removable engagement with the cabinet over the compartment for selectively enclosing the power input terminal arrangement; providing a second cover member having a power input meter arrangement with a current transformer input having an opening, which is adapted for removable engagement with the cabinet over the compartment for selectively enclosing the compartment; and mounting either the first cover member or the second cover member to the cabinet over the compartment. The step of mounting the second cover member includes passing the power supply wires through the opening defined by the current transformer input, for providing a current in the current transformer indicative of power supplied to the power transfer device, for providing a visual output from the power input meter arrangement.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
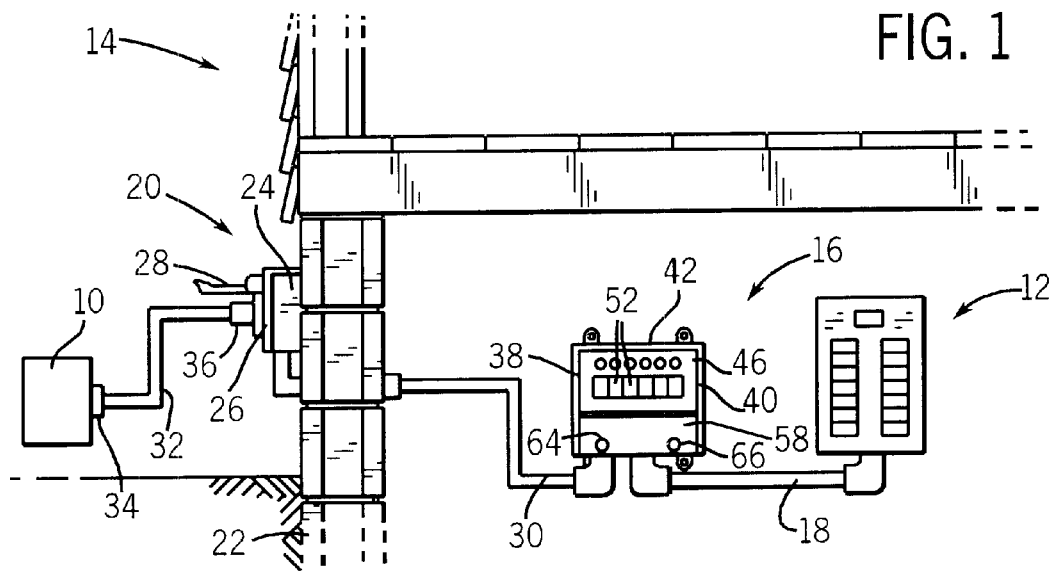
FIG. 1 is a schematic representation showing the power transfer arrangement constructed according to the invention for interposition between a remote power inlet arrangement fed by a portable power generator and an electrical panel associated with a building.

FIG. 1 shows a power inlet arrangement for interconnecting a portable generator 10 with a main electrical panel or load center 12 located in the interior of a building 14. In the power inlet arrangement of FIG. 1, a manual power transfer switching mechanism 16 constructed in accordance with the invention is mounted adjacent main panel 12 and is interconnected therewith via a series of wires enclosed by a conduit 18 extending between main panel 12 and switching mechanism 16.

A power inlet box 20 is mounted to the wall of building 14, as shown at 22. Power inlet box 20 includes an external housing including a series of walls such as 24, and a recessed power inlet 26 mounted to a front wall of the housing. A cover 28 is mounted to the front wall of the housing via a hinge structure and is movable between an open position, as shown in FIG. 1 and a closed position in which cover 28 encloses recessed power inlet 26 when not in use. A conduit 30 extends between inlet box 20 and switching mechanism 16 and provides a direct electrical connection therebetween. Appropriate wiring and connections are contained within inlet box 20 and conduit 30 for providing an electrical path between inlet box 20 and switching mechanism 16.

A power cord 32 extends between generator 10 and power inlet box 20. Cord 32 includes a plug 34 at one end, which is engageable with the power outlet of generator 10. Cord 32 further includes a connector 36 at the end opposite plug 34. Connector 36 is engageable with recessed power inlet 26 for transferring power generated by generator 10 to power inlet box 20, which is then supplied through the wiring in conduit 30 to switching mechanism 16, and from switching mechanism 16 through the wiring in conduit 18 to main panel 12. In this manner, generator 10 functions to provide power to selected circuits of main panel 12 during a power outage. In this arrangement, the user first connects cord 32 between generator 10 and power inlet 20, and then commences operation of generator 10.

Figure 3:
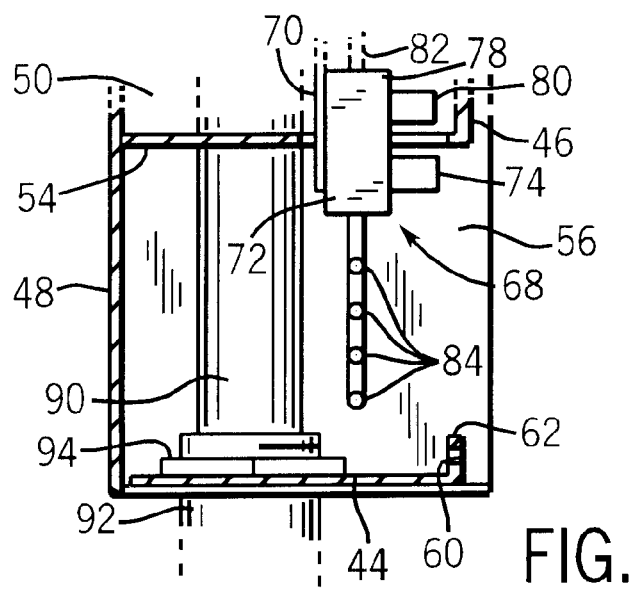
FIG. 3 is a partial, sectional view taken on line 3—3 of FIG. 2.
Figure 4:
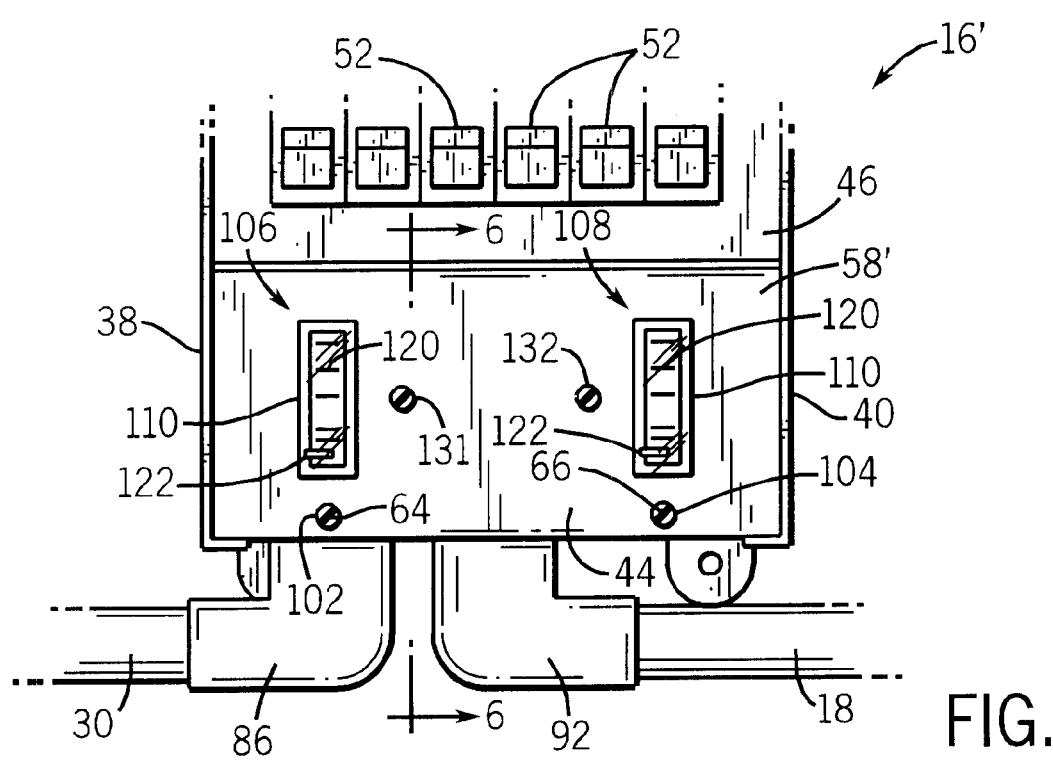
FIG. 4 is a partial, front elevational view showing the bottom portion of an alternative power transfer arrangement in which the access cover is provided with a wire connection version of an optional meter arrangement, shown in an installed condition.

Switching mechanism 16 is interposed between load center 12 and inlet box 20. Switching mechanism 16 includes a cabinet defining a pair of side walls 38, 40, a top wall 42 extending between the upper ends of side walls 38 and 40, a bottom wall 44 extending between and interconnecting the lower ends of side walls 38 and 40, a partial height front panel 46 and a rear panel 48 (FIG. 3). Walls 38–44, in combination with front panel 46 and rear panel 48 define an upper cavity 50 within which a series of circuit breakers or switches 52 are located. Front panel 46 is bent rearwardly at its lower end to form an intermediate transverse wall 54 which defines the lower extent of upper cavity 50. A terminal compartment 56 is defined by an intermediate transverse wall 54 in combination with bottom wall 44, the lower portions of side walls 38 and 40 and the lower portion of rear panel 48. Terminal compartment 56 is accessible through an opening below front panel 46. A cover 58 (FIG. 1) is sized so as to close the opening of terminal compartment 56. Cover 58 includes a pair of openings in alignment with openings 60 formed in a pair of tabs 62 mounted to bottom wall 44, to enable cover 58 to be mounted to bottom wall 44 utilizing threaded fasteners 64, 66 (FIG. 1) which extend through the openings in cover 58 and into engagement with the openings 60 in tabs 62. In this manner, cover 58 is selectively engaged with bottom wall 44 to provide access to terminal compartment 56, and is connected to bottom wall 44 so as to prevent access to terminal compartment 56.

Figure 2:
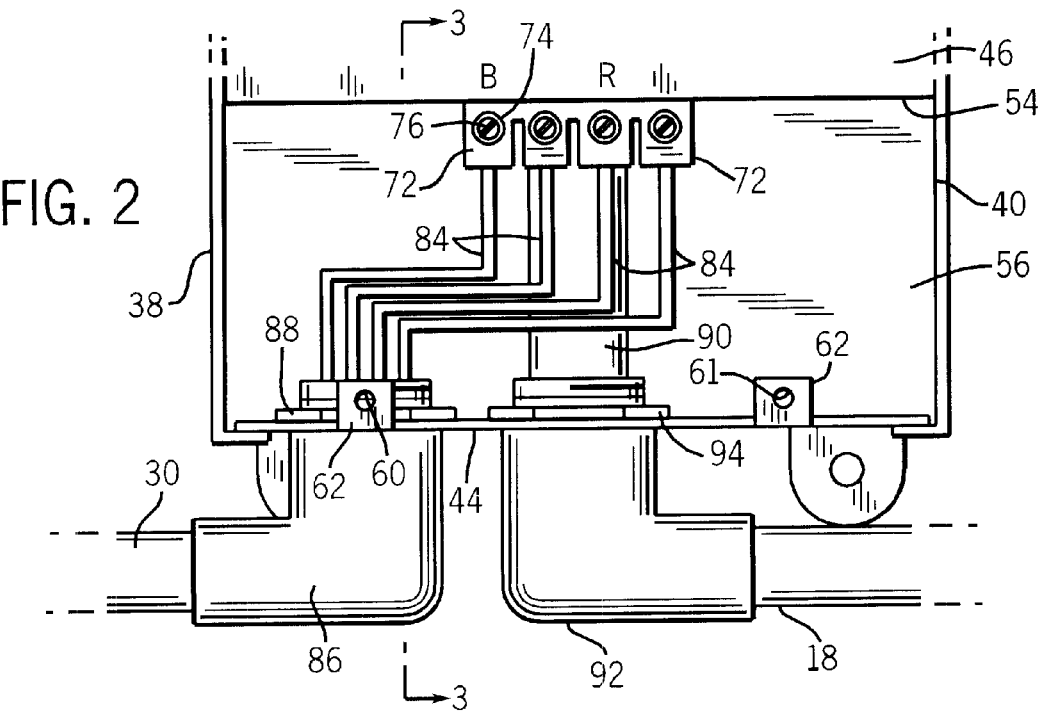
FIG. 2 is a partial, front elevational view showing the bottom portion of the power transfer arrangement of FIG. 1 with the access cover removed.

A terminal assembly 68 is mounted to a terminal plate 70, which is mounted at its ends to intermediate transverse wall 54 to fix terminal assembly 68 in position relative to intermediate transverse wall 54. Terminal assembly 68 is of conventional construction, including a series of cylindrical receivers 72, each of which defines a downwardly facing opening. Each receiver 72 includes an outwardly extending cylindrical member 74 extending perpendicularly to receiver 72, defining a passage for receiving a threaded member, the head of which is shown at 76 (FIG. 2). Receivers 72 are accessible from and in communication with terminal compartment 56. Terminal assembly 68 further includes a series of upwardly opening cylindrical receivers 78, which are disposed within upper cavity 50. Each upper cylindrical receiver 78 includes a cylindrical member 80 which receives a threaded member (not shown).

Terminal assembly 68 may illustratively be a terminal assembly such as is available from Atech Corp. of Somerville, N.J., under its Model No. TSF/16, although it is understood that any other satisfactory terminal arrangement could be employed. In a terminal arrangement such as this, receivers 72 and 78 are formed of a molded plastic material integrally with cylindrical member 74 and cylindrical member 80. These components surround metal contact assemblies with one of the contact assemblies being located in both a cylindrical receiver 72 and a cylindrical receiver 78. In this manner, an electrical connection to terminal assembly 68 is made by inserting a bare wire into the open lower end of receiver 72 and tightening the threaded member utilizing its head 76, to establish an electrical connection with the wire via the metal contact enclosed within cylindrical receiver 72. A similar operation is employed to connect the wire end to the contact enclosed by the opposed cylindrical receiver 78 so as to establish a connection between the wires connected to the terminal assembly in this manner.

As shown in FIG. 3, a wire such as 82 is connected to each upper cylindrical receiver 78 at one end. Two of wires 82 feed bus bars (not shown), which in turn are interconnected with switches 52 to provide power to switches 52. A third one of wires 82 is a neutral wire which is connected to the neutral of load center 12 and a fourth one of wires 82 is a ground wire attached to the frame of transfer switching mechanism 16.

Referring to FIGS. 1 and 2, conduit 30 extends between the power inlet box 20 and switching mechanism 16. Conduit 30 encloses a series of power input wires 84 (FIG. 2), and extends through a knock-out opening formed in the bottom wall 44 via a conventional conduit fitting 86 and lock nut 88. As can be appreciated, an input wire conduit could also be connected through a knock-out in either side wall 38 or 40, or in a knock-out opening in the lower portion of rear panel 48.

The ends of power input wires 84 are connected to terminal assembly 68 by placing the bare end of each wire 84 into one of the receivers 72 and tightening the associated threaded member, as explained previously, to establish an electrical connection with a contact member enclosed by one of the cylindrical receivers 72. In this manner, input power is supplied from remote power inlet 20 to terminal assembly 68, which is subsequently transferred from terminal assembly 68 to wires 82 and thereby to switches 52, as explained previously. This arrangement enables a person in installing switching mechanism 16, such as an electrician or do-it-yourself homeowner, to establish a direct electrical connection between remote power inlet box 20 and switching mechanism 16 without the need for connecting a flexible cord to a power input receptacle, as in the prior art. In this manner, after generator power cord 32 is plugged into remote power inlet box 20, the only necessary operation in connection with switching mechanism 16 to enable transfer of power from generator 10 to load center 12 is to place switches 52 in the appropriate position so as to transfer power to load center 12 as desired in response to operation of the generator 10.

Output wires from switches 52, shown at 90, extend through terminal compartment 56 to a conduit fitting 92 secured to bottom wall 44 by lock nut 94 for routing the wires through conduit 18 to load center 12. Other wires extend through terminal compartment 56, such as neutral and ground wires, as well as input wires from load center 12.

It can thus be appreciated that the provision of terminal compartment 56 provides an extremely convenient and simple arrangement for establishing a direct, hardwired connection between power inlet box 20 and power transfer switching mechanism 16. The user or installer simply must remove cover 58 to gain access to terminal compartment 56 for connecting or disengaging power input wires 84 to or from terminal assembly 68. Terminal compartment 56 also provides a convenient cavity to provide pulling of wires through conduit 30. Once the user has completed the necessary operations at terminal compartment 56, the user simply replaces cover 58, as described previously, to thereby prevent access to terminal compartment 56.

The above description pertains to a power supply arrangement as disclosed in Flegel U.S. Pat. No. 5,895,981, previously incorporated by reference.

Figure 5:
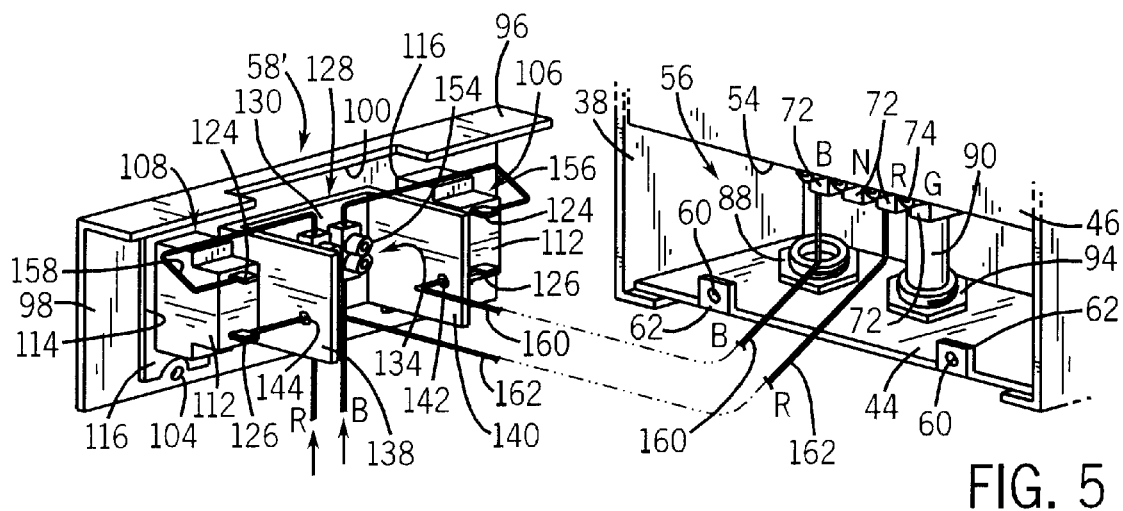
FIG. 5 is an exploded view of the access cover and bottom portions of the alternative power transfer arrangement shown in FIG. 4.
Figure 6:
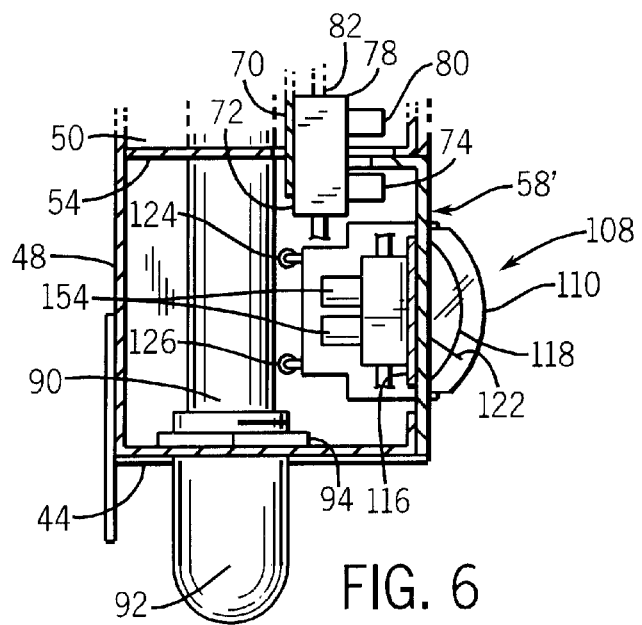
FIG. 6 is a partial, sectional view taken on line 6—6 of FIG. 4.
Figure 7:
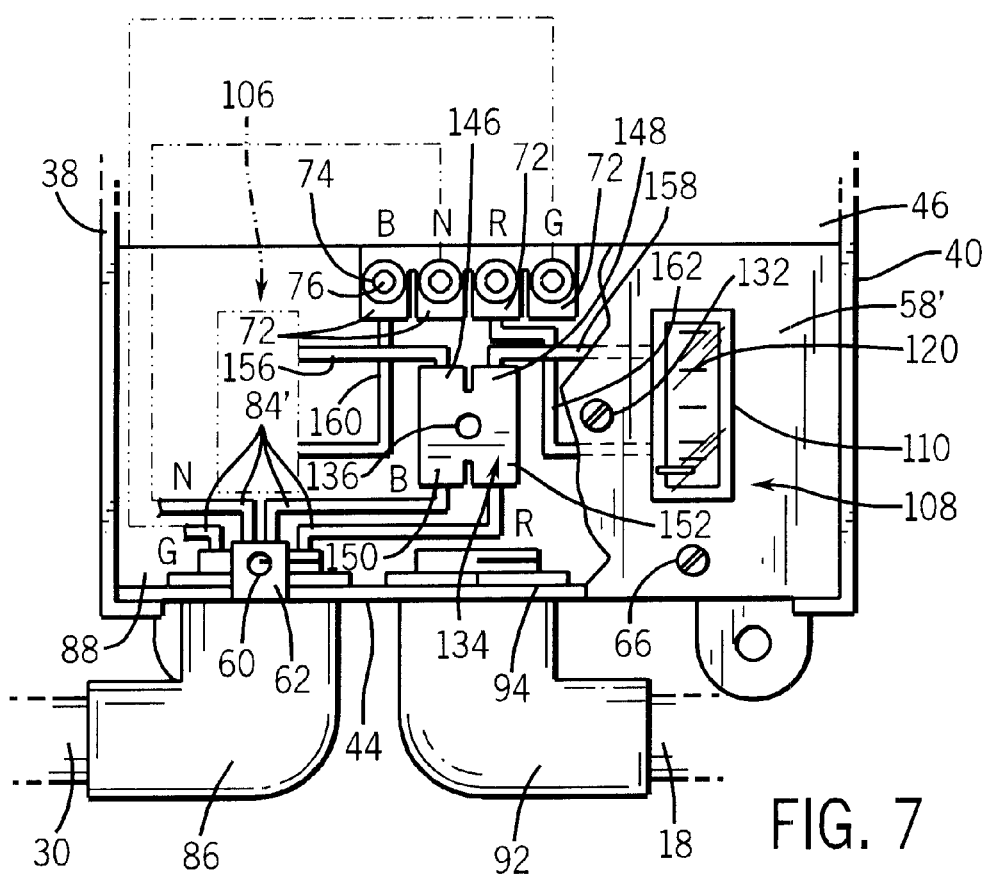
FIG. 7 is a view similar to FIG. 4 but showing a part of the access cover broken away to view the components in the bottom portion of the alternative power transfer arrangement.
Figure 8:
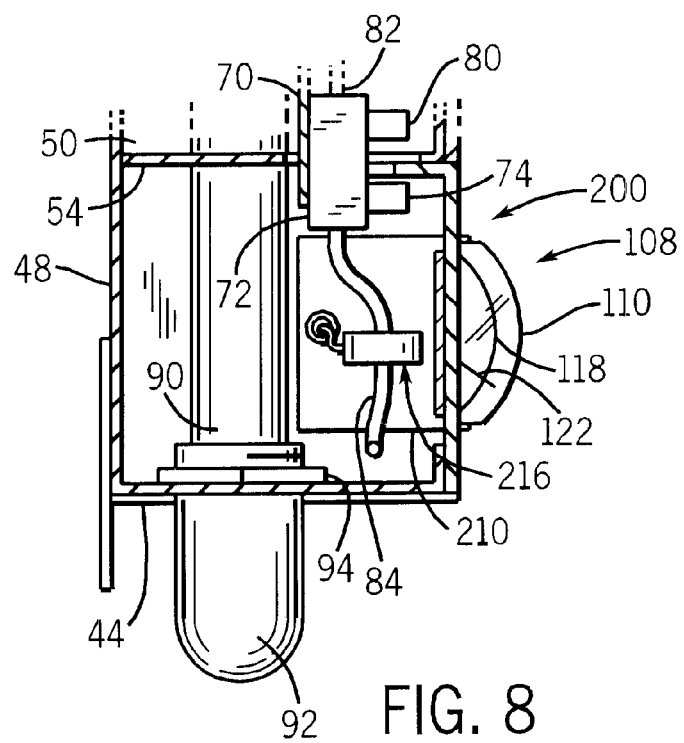
FIG. 8 is a view similar to FIG. 6, showing an alternative power input meter arrangement in accordance with the invention, incorporated into the power transfer arrangement.
Figure 9:
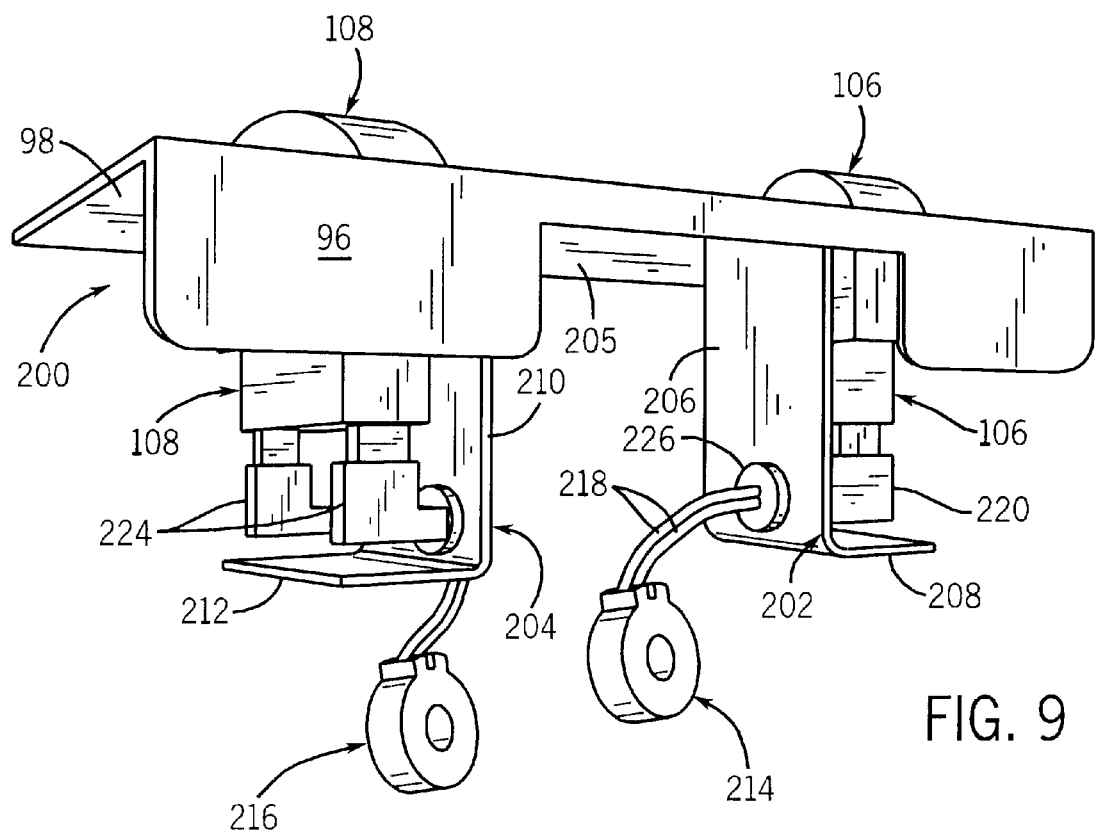
FIG. 9 is an isometric view showing the cover member incorporated into the alternative power input meter arrangement of FIG. 8.
Figure 10:
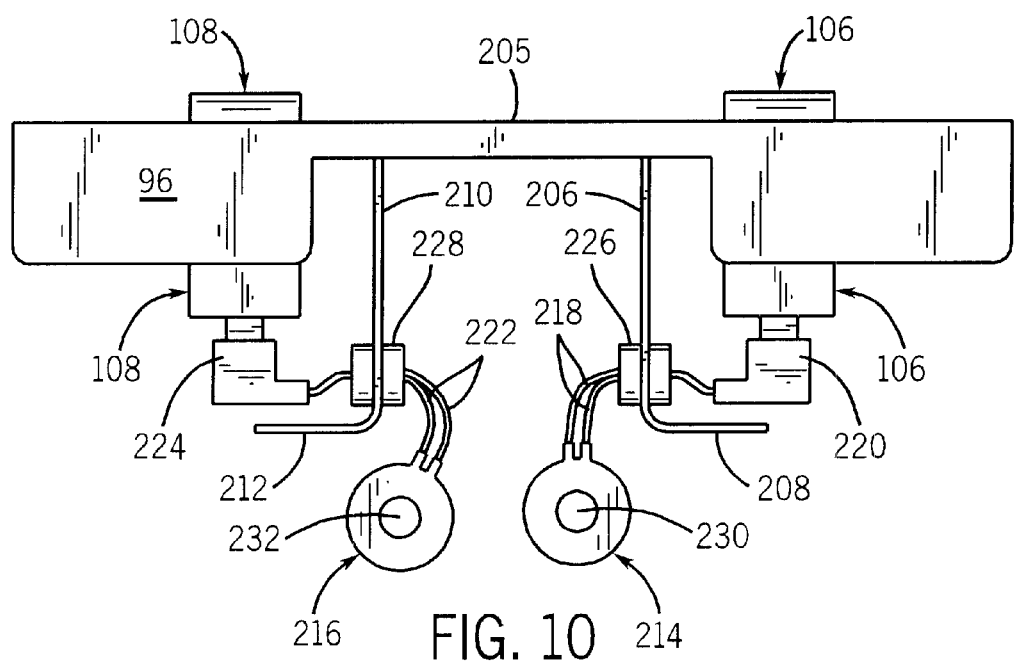
FIG. 10 is a top plan view of the cover member of FIG. 9.
Figure 11:
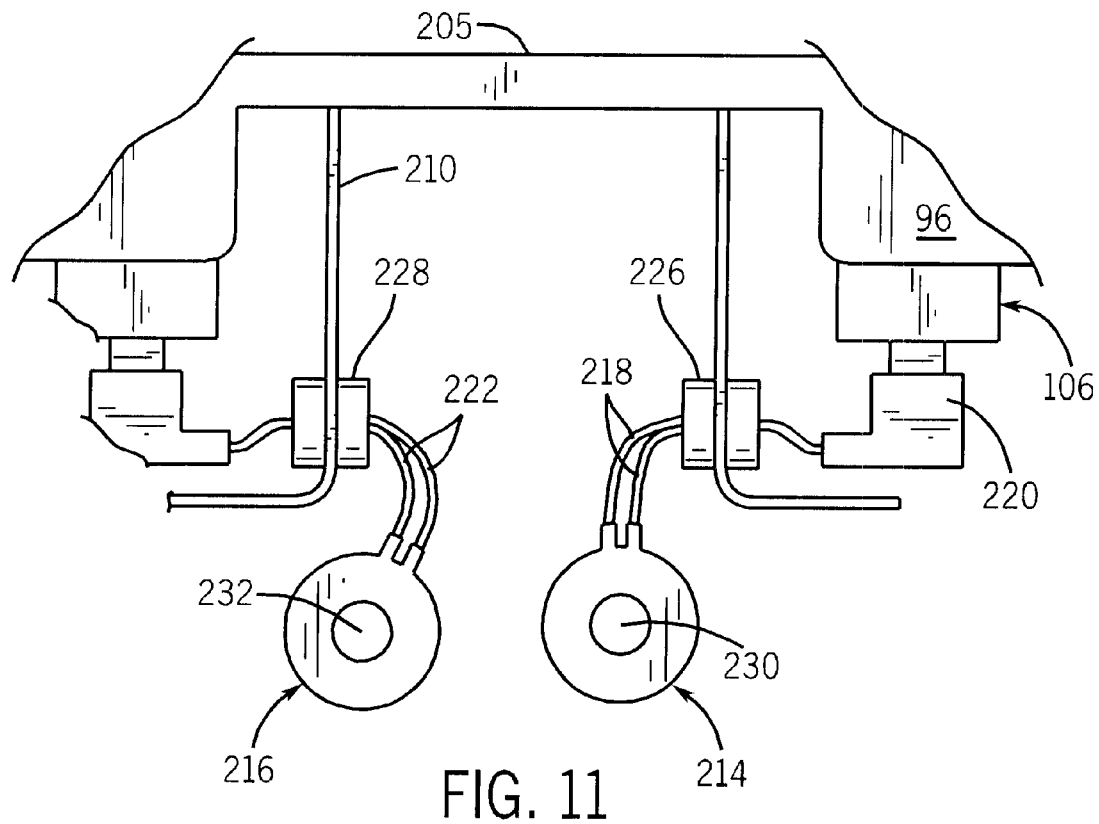
FIG. 11 is an enlarged partial top plan view showing one of the power input meters in the cover member of FIGS. 8–10.
Figure 12:
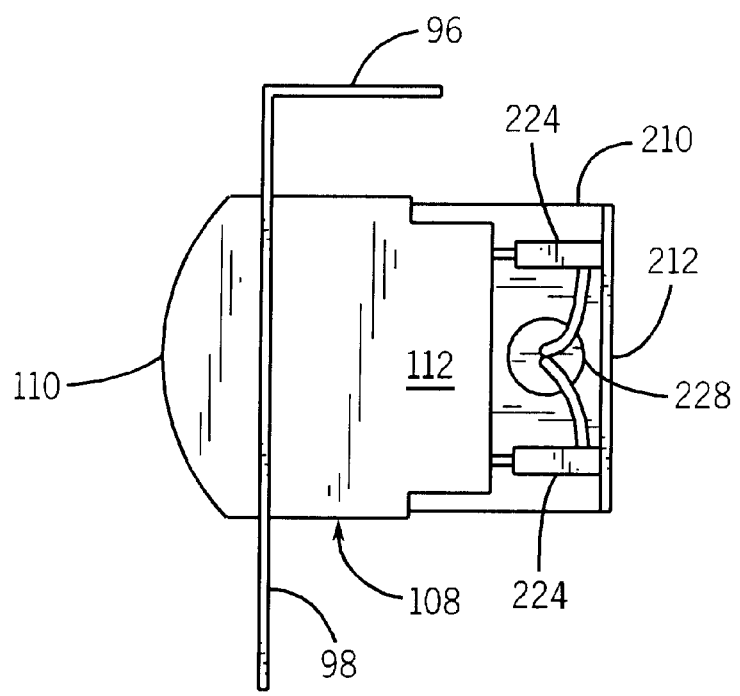
FIG. 12 is a side elevation view of the cover member of FIGS. 8–11.

FIGS. 4–7 disclose an alternative embodiment as disclosed in Flegel U.S. Pat. No. 6,107,701, previously incorporated by reference. In this embodiment, power transfer arrangement 16' has substantially identical components as previously described in FIGS. 1–3, except for removable access cover plate 58' and power input wires 84' (FIG. 7). In this power transfer arrangement 16', cover 58' has a rearwardly extending ledge 96 which is engageable beneath the transverse wall 54 of the front panel 46, and a vertically extending wall 98 which depends downwardly from ledge 96 and is engage-able against cabinet side walls 38, 40 and end wall 44. As seen in FIG. 5, ledge 96 includes a central recess 100 for accommodating the power input terminals defined by receiver 72 and cylindrical member 74. It should be appreciated that cover 58 also includes ledge 96, vertical wall 98, and central recess 100.

Cover 58' further includes a pair of openings 102, 104 in alignment with openings 60 formed in the pair of tabs 62 projecting from bottom wall 44 to enable cover 58' to be secured to bottom wall 44 by threaded fasteners 64, 66 which extend through the cover openings 102, 104 and into threaded engagement with tab openings 60.

Cover 58' is provided with power input indicating structure in the form of a pair of spaced apart watt meters 106, 108 which are connected to the power input terminal arrangement 68 and are selectively used to display the amount of power supplied by the generator 10 during a power outage. Each of the watt meters 106, 108 has a convexly-shaped forward portion 110 integrally attached to a T block-shaped rear portion 112. Each forward portion 110 projects through a respective rectangular opening 114 formed in wall 98, and is attached to the inside of wall 98 by a pair of spring-biased retainers 116. Each forward portion 110 defines a transparent window having a convexly-shaped support member 118 for mounting a wattage scale 120 visible through the window, and an indicator 122 mounted for movement along the scale 120 in response to the supplying of generator power. Each rear portion 112 extends rearwardly and perpendicularly to wall 98 and is provided with a pair of upper and lower terminals 124, 126, respectively, for connection with suitable wiring to be further explained below.

In order to facilitate connection of the watt meters 106, 108 to the power input terminal arrangement 68 the power input indicating structure also includes a one-piece, U-shaped attachment bracket 128 (FIG. 5) positioned on the inside of wall 98 between the watt meters 106, 108. Bracket 128 is fastened by a pair of screws 131, 132 which are passed through quibble unthreaded openings in wall 98, and received in suitably threaded openings in a flat base plate 130 of bracket 128. Base plate 130 serves as a support for an H-shaped terminal connector 134 which is removably fastened by a single screw 136 (FIG. 7) to a threaded grommet (not shown) retained in the base plate 130. Bracket 128 also has a pair of parallel side plates 138, 140 which extend rearwardly from base plate 130, and serve as supports for a pair of wire guiding, cylindrical holders 142, 144.

Terminal connector 134 has a structure similar to terminal assembly 68 and includes a pair of upwardly opening cylindrical receivers 146, 148 and a pair of downwardly opening cylindrical receivers 150, 152. Each receiver 146–152 has an inwardly extending cylindrical member 154 (FIG. 6) lying perpendicularly to receivers 146–152 and defining a passage for receiving a threaded member (not shown). As seen in FIG. 7, the ends of first and second input wires 84' designated B and R, respectively, are connected to the bottom receivers 150, 152 in a manner as previously described in relation to terminal assembly 68. The third input wire 84' designated N is connected to receiver 72 designated N, and is further connected through conduit 18 to the neutral bar of load center 12. The fourth input wire 84' designated G is attached to receiver 72 designated G, and is also attached to the frame of transfer switch 16. A fifth wire 156 interconnects upper terminal 124 of watt meter 106 with upper receiver 146 of connector 134. A sixth wire 158 showing upper terminal 124 of watt meter 108 with the other upper receiver 148. A seventh wire 160 passes through holder 142 and connects the bottom terminal 126 of watt meter 106 with receiver 72 designated B. An eighth wire 162 passes through holder 144 and connects the bottom terminal 126 of watt meter 108 with receiver 72 designated R.

FIGS. 8–12 illustrate a cover 200 in accordance with the invention, which is adapted for engagement over compartment 56. Cover 200 has many of the same components as shown and described in connection with cover 58', and like reference characters will be used where possible to facilitate clarity. Generally, the structure of cover 200 is the same as cover 58', including rearwardly extending ledge 96, vertically extending wall 98, and spaced apart watt meters 106, 108 having forward portions 110 and rear portions 112.

Mirror image bracket members 202, 204 extend rearwardly from a transverse mounting wall 205 secured to vertical wall 98, located behind watt meters 106, 108, respectively. Bracket member 202 defines a rearwardly extending wall 206 and a transverse wall 208, and bracket member 204 defines a rearwardly extending wall 210 and a transverse wall 212. Transverse wall 208 is spaced rearwardly from the prong-type contact members of watt meter 106, and transverse wall 212 is spaced rearwardly from the prong-type contacts of watt meter 108.

A current transformer input arrangement is interconnected with the contacts of watt meters 106, 108, respectively, including current transformers 214, 216, respectively. Current transformer 214 includes a pair of input wires 218 which are interconnected with socket-type engagement members 220, which are adapted to be pushed onto the prong-type contact members of watt meter 106. Similarly, current transformer 216 includes a pair of input wires 222 which are interconnected with socket-type engagement members 224, which are adapted to be pushed onto the prong-type contact members of watt meter 108. Input wires 218 of current transformer 214 extend through an opening formed in rearwardly extending wall 206, and a strain relief grommet 226 engages wires 218 within the opening in rearwardly extending wall 206. Similarly, input wires 222 of current transformer 216 extend through an opening in rearwardly extending wall 210 of bracket member 204, and a strain relief grommet 228 is engaged with input wires 222 within the opening. Current transformers 214, 216 define internal, closed openings 230, 232, respectively.

Openings 230, 232 of current transformers 214, 216, respectfully, are adapted to receive selected ones of power input wires 84. In accordance with known current transformer operation, each current transformer 214, 216 includes a coil surrounding its respective opening 230, 232. Current in power input wire 84 induces current in the coil of the current transformer 214, 216 through which power input wire 84 extends, corresponding to the level of current in power input wire 84. Each current transformer 214, 216 and its associated wires 218, 222, respectively, completes a circuit with its respective watt meter 106, 108, such that the induced current corresponds to the amount of power being supplied to power transfer switching mechanism 16 through power input wire 84. The current level is converted by watt meters 106, 108 into a visual indication of the input power level, to provide the user with an indication as to the power supplied from generator 10 so as to prevent overloading of power transfer switching mechanism 16.

Current transformers 214, 216 are coil-type current transformers such as are available from C. R. Magnetics of Fenton, Mo. under its Model No. CR8411-1000, although it is understood that any other type of closed current transformer construction may be employed.

In assembly, cover 200 is adapted to be engaged over compartment 56 in the same manner as described previously with respect to covers 58, 58'. Before making final connections of cover 200, power input wires 84 are threaded through openings 230, 232 of current transformers 214, 216, respectively, prior to engagement with terminals 72. In this manner, a power input meter arrangement is quickly and easily provided for power transfer switching mechanism 16, without the need for connecting the power input meters with the power input arrangement and terminals 72, as in the prior art.

It should be understood that current transformers 214, 216 may be employed in any type of power supply arrangement, and are not limited to the specific details of the power supply arrangement as shown and described. In particular, power input wires such as 84 may be passed through the openings of current transformers 214, 216 and connected directly to switches 52, thus eliminating the need for power input terminals 72. However, the presence of power input terminals 72 facilitates relatively quick and easy installation of cover 200, which is particularly advantageous in a retrofit application.

It can thus be appreciated that a manufacturer can provide either a hardwired power transfer switching mechanism 16 or a meter-enhanced power transfer switching mechanism 16' simply by mounting either cover 58, 58' or 200 to the cabinet over terminal compartment 56. With cover 58' or cover 200 in place, an operator is able to read the power being drawn on generator 10 so as to balance the loads and avoid overloading which can stall or slow the generator 10. The interchangeability of covers 58,58' and 200 provides significant efficiencies in manufacturing by providing a large number of common components for different models. It should also be understood that switch mechanism 16 and 16' can be retrofit in the field to provide desired cover 58, 58' or 200.

Various alternatives and embodiments are contemplated as being within the scope of the following claims particularly pointing out and distinctly claiming the subject matter regarded as the invention.

I claim:

1. A power transfer arrangement for use in combination with a building electrical system interconnected with a utility power source, comprising:
   a generator for supplying auxiliary power; and
   a power transfer device interconnected with the building electrical system, wherein the power transfer device includes:
      one or more power supply wires interconnected with the generator for supplying power to the power transfer device from the generator;
      a power input indicating member including a visual output arrangement; and
      a current transformer interconnected with the power input indicating member, wherein the current transformer defines an opening;
   wherein at least one of the power supply wires of the power transfer device extends through the opening of the current transformer, wherein the current transformer interacts with current in the one or more power supply wires and provides an input to the power input indicating member to provide an indication of the amount of power supplied to the power transfer device from the generator.

2. The arrangement of claim 1, wherein the power transfer device includes a cabinet defining a compartment through which the one or more power supply wires extend, and wherein the power input indicating member is mounted to a cover adapted for selective engagement with the cabinet over the compartment.

3. The arrangement of claim 2, wherein the compartment includes a set of terminals to which the one or more power supply wires are connected.

4. The arrangement of claim 3, wherein the cabinet defines an opening providing access to the terminal compartment, and wherein the cover is selectively positionable over the opening and removably engageable with the cabinet for selectively closing the opening for preventing access to the terminal compartment.

5. The arrangement of claim 2, wherein the current transformer is interconnected with the power input indicating member by means of a pair of wires, and further comprising a support wall interconnected with the cover, wherein the support wall defines an opening through which the pair of wires extend.

6. The arrangement of claim 5, wherein a strain relief member is engaged within the opening in the support wall, and wherein the wires extend through the strain relief member.

7. In a power transfer device adapted for interconnection with the electrical system of a building and including a cabinet, a set of switches mounted to the cabinet, and a set of power input wires interconnected with the switches for providing power input to the switches from an auxiliary power source, the improvement comprising
   a compartment associated with the cabinet, wherein the power input wires extend through the compartment,
   a cover removably engageable with the cabinet over the compartment,
   a power input indicating member carried by the cover, and
   a current transformer input arrangement interconnected with the power input indicating member, wherein the current transformer input arrangement is located within the compartment and includes an opening through which at least one of the power input wires extends.

8. The improvement of claim 7, wherein the current transformer input arrangement includes a pair of wires interconnected with a pair of connectors defined by the power input indicating member, and further comprising a support structure interconnected with the cover, wherein the support structure defines an opening through which the wires extend.

9. The improvement of claim 8, further comprising a strain relief member disposed within the opening and engaged with the pair of wires for preventing disengagement of the wires from the connectors of the power input indicating member.

10. A method of indicating power supplied to a power transfer device from an auxiliary power source, wherein the power transfer device is interconnected in the electrical system of a building, comprising the steps of:
    interconnecting one or more power input wires with the power transfer device for supplying power thereto from the auxiliary power source;
    providing a power input indicating member for the power transfer device, wherein the power input indicating member includes a current transformer input arrangement defining an opening; and
    passing at least one of the power input wires through the opening of the current transformer input arrangement, wherein the current transformer input arrangement is responsive to current in the one or more power input wires for providing an input to the power input indicating arrangement indicative of the amount of power supplied to the power transfer device from the auxiliary power source through the one or more power supply wires.

11. The method of claim 10, wherein the power transfer device includes a cabinet defining a compartment through which the one or more power supply wires extend, and wherein the step of providing the power input indicating arrangement is carried out by mounting the power input indicating arrangement to the cover and selectively engaging the cover with the cabinet over the compartment.

12. The method of claim 11, wherein the current transformer input arrangement includes a pair of wires, and
    further comprising the step of supporting the pair of wires between a current transformer member defined by the current transformer input arrangement and one or more connectors forming a part of the power input indicating member.

* * * * *